(12) United States Patent
Hapfelmeier et al.

(10) Patent No.: US 11,615,209 B2
(45) Date of Patent: Mar. 28, 2023

(54) BIG DATA K-ANONYMIZING BY PARALLEL SEMANTIC MICRO-AGGREGATION

(71) Applicant: Siemens Aktiengesellschaft, Munich (DE)

(72) Inventors: Andreas Hapfelmeier, Sauerlach (DE); Mike Imig, Cologne (DE); Michael Mock, Bonn (DE)

(73) Assignee: SIEMENS AKTIENGESELLSCHAFT

( * ) Notice: Subject to any disclaimer, the term of this patent is extended or adjusted under 35 U.S.C. 154(b) by 1082 days.

(21) Appl. No.: 16/323,865

(22) PCT Filed: Aug. 10, 2016

(86) PCT No.: PCT/EP2016/069081
§ 371 (c)(1),
(2) Date: Feb. 7, 2019

(87) PCT Pub. No.: WO2018/028783
PCT Pub. Date: Feb. 15, 2018

(65) Prior Publication Data
US 2019/0213357 A1 Jul. 11, 2019

(51) Int. Cl.
*G06F 21/62* (2013.01)
*G06F 16/00* (2019.01)
(Continued)

(52) U.S. Cl.
CPC .......... *G06F 21/6254* (2013.01); *G06F 16/00* (2019.01); *G06F 16/901* (2019.01); *G06F 16/906* (2019.01)

(58) Field of Classification Search
CPC ...... G06F 16/00; G06F 16/901; G06F 16/906; G06F 21/6254
See application file for complete search history.

(56) References Cited

U.S. PATENT DOCUMENTS 7,269,578 B2   9/2007 Sweeney
2002/0169793 A1*  11/2002 Sweeney .............. G06Q 20/383
715/255

(Continued)

OTHER PUBLICATIONS

M. Shin, S. Yoo, K. H. Lee and D. Lee, "Electronic Medical Records privacy preservation through k-anonymity clustering method," The 6th International Conference on Soft Computing and Intelligent Systems, and The 13th International Symposium on Advanced Intelligence Systems, 2012, pp. 1119-1124. (Year: 2012).*

(Continued)

*Primary Examiner* — Amie C. Lin
*Assistant Examiner* — Hamid Talaminaei
(74) *Attorney, Agent, or Firm* — Schmeiser, Olsen & Watts LLP

(57) ABSTRACT

Provided is a method for anonymizing datasets having sensitive information, including the steps of determining a dataset of records to be assigned to aggregation clusters; computing an average record of the dataset on the basis of a predefined repetition counter; finding a most distant first record to the average record using a distance measure; finding a most distant second record from the first record using the distance measure; forming a first aggregation cluster around the first record and a second aggregation cluster around the second record; and generating a new dataset by subtracting the first cluster and the second cluster from the previous dataset.

9 Claims, 3 Drawing Sheets

(51) Int. Cl.
    *G06F 16/901*    (2019.01)
    *G06F 16/906*    (2019.01)

(56) References Cited

U.S. PATENT DOCUMENTS

2008/0209179 A1* 8/2008 Barsness ............ G06F 11/3404
                                              712/E9.008
2010/0114920 A1* 5/2010 Srivastava .......... G06F 21/6254
                                              707/E17.014
2015/0294121 A1* 10/2015 Yamaoka ............. G06F 16/254
                                              726/26

OTHER PUBLICATIONS

Domingo-Ferrer, J., Torra, V. Ordinal, Continuous and Heterogeneous k-Anonymity Through Microaggregation. Data Min Knowl Discovery, 11, 195-212 (Year: 2005).*

Solé Marc et al: "Efficient microaggregation techniques for large numerical data volumes", International Journal of Information Security, Springer, Berlin, DE, vol. 11, No. 4, pp. 253-267, XP035088924, ISSN: 1615-5270, DOI: 10.1007/S10207-012-0158-5, p. 255; 2012.

Domingo-Ferrer Josep et al: "Ordinal, Continuous and Heterogeneous k-Anonymity Through Microaggregation", Data Mining and Knowledge Discovery, Kluwer Academic Publishers, BO, vol. 11, No. 2, pp. 195-212, XP019277075, ISSN: 1573-756X; 2005.

PCT International Search Report and Written Opinion of International Searching Authority dated Nov. 4, 2017 corresponding to PCT International Application No. PCT/EP2016/069081 filed Oct. 8, 2016.

* cited by examiner

BIG DATA K-ANONYMIZING BY PARALLEL SEMANTIC MICRO-AGGREGATION

CROSS-REFERENCE TO RELATED APPLICATIONS

This application claims priority to PCT Application No PCT/EP2016/069081, having a filing date of Aug. 10, 2016, the entire contents of which are hereby incorporated by reference.

FIELD OF TECHNOLOGY

The following relates to a method, a system, a computer cluster and a computer program product for anonymizing large datasets (big data) having sensitive information of entities.

BACKGROUND

Protecting privacy of entities, e.g. persons, engines, factories, is an important issue in processing data. More particular it is important to protect privacy in data that are shared, distributed, or read by non-authorized persons. A common measure for protecting privacy is to remove private information (attributes) that can be used to directly identify individual entities, like names or phone numbers.

However, mere removing of private information is not sufficient for guaranteeing complete privacy, since external information can be recombined with further non-private information of the dataset in order to again determine an identity. This non-private information that can be used for re-constructing private information is called quasi-identifier.

For example, patients can be re-identified by recombining an address list containing names, ages, sex, and zip-codes with an anonymized record containing age, sex, and zip-code, although the names have been removed from the anonymized record. Thus, information about age, sex, and zip-code is considered as quasi-identifiers.

A measure for preventing this recombination of data is called k-anonymity. In obtaining k-anonymity the record is clustered in a way that a combination of quasi-identifiers is associated with at least a number of k entities.

In the aforementioned example the values of the quasi-identifiers can be generalized or aggregated in a way that a combination of age "40-50", zip-code "8080*", and sex "M" is formed in which a number of k persons fall. Even in an attempt of reconstructing private information by using quasi-identifiers a number of k persons would be found. Thus, the single individual cannot be identified within the group of k persons.

Digital strategies of firms provide a huge amount of information (big data). For processing this huge amount of information in an open way private or confidential information has to be removed. Thus, big data is always a challenge for privacy methods. In particular, k-anonymity has two major challenges, namely increasing speed for processing big data and reasonable processing of nominal attributes that are a major part of big data.

Document U.S. Pat. No. 7,269,578 B2 relates to systems and methods for deidentifying, or anonymizing, entries in an input data source.

Document "Ordinal, Continuous and Heterogeneous k-Anonymity Through Microaggregation", Josep Domingo-Ferrer, Vicenc Torra; 2005, Data Mining and Knowledge Discovery, describes a method how to obtain k-anonymity by clustering of data.

While the US patent explains the properties of k-Anonymity, the Document by Josep Domingo-Ferrer shows a specific implementation of the concept by using micro-aggregation. However, this method is slow since a huge number of iterations has to be performed. For example, the complete dataset is iterated in order to calculate several distance comparisons for each of the elements in each iteration. Thus, this method cannot be used for processing and anonymizing big data.

Further, nominal attributes are a major element in big data. Anonymizing of log files or text passages is an essential objective of an anonymizing algorithm for big data. Although the aforementioned micro-aggregation method does provide a distance method and an aggregation method on the basis of nominal values, it is insufficient for nominal attributes, since the semantic similarity is not considered. For example, the distance is only given by 1 or 0 depending on if the nominal values are equal or not. More fine grained distances based on similarity are impossible. For the common representative value of the group the most frequent value is used as aggregation method.

In consequence futile results may be obtained that provide anonymity but cannot be used for further analyzing the processed data. An example of a futile result on the basis of the most frequent value is given by the place of residence of persons. If the majority of persons of the dataset is resident in a particular town, all persons would be assigned to this town in the aforementioned aggregation method. However, this assignment would not be true for all of the persons.

SUMMARY

An aspect relates to improve the processing speed and the processing of nominal attributes for anonymizing big data in terms of k-anonymity.

According to a first aspect this is solved by a method for anonymizing datasets having sensitive information, comprising the steps of determining a dataset of records to be assigned to aggregation clusters; computing an average record of the dataset on the basis of a predefined repetition counter; finding a most distant first record to the average record using a distance measure; finding a most distant second record from the first record using the distance measure; forming a first aggregation cluster around the first record and a second aggregation cluster around the second record; and generating a new dataset by subtracting the first cluster and the second cluster from the previous dataset. The method further comprises the step of applying the aggregation method attribute-wise on the records in the clusters. The method provides the technical advantage that datasets can be anonymized faster as compared to the known micro-aggregation method. Execution speed can be further increased by the following exemplary embodiments.

In an exemplary embodiment of the method the first cluster comprises a number of records closest to the first record.

In a further exemplary embodiment of the method the second cluster comprises a number of records closest to the second record.

In a further exemplary embodiment of the method finding the most distant first record is performed on the basis of the predefined repetition counter.

In a further exemplary embodiment of the method finding the most distant second record from the first record is performed on the basis of the predefined repetition counter.

In a further exemplary embodiment of the method the step of computing an average record is performed parallel or distributed on a number of nodes.

In a further exemplary embodiment of the method the step of finding the most distant first record is performed parallel or distributed on a number of nodes.

In a further exemplary embodiment of the method the step of finding the most distant second record is performed parallel or distributed on a number of nodes.

In a further exemplary embodiment of the method the average record is computed attribute-wise based on an aggregation function.

In a further exemplary embodiment of the method a hierarchical generalization having a number of generalization stages is used for computing the average record of nominal attribute of the dataset or the distance between nominal values.

According to a second aspect this is solved by a system for anonymizing datasets having sensitive information, comprising a determining module for determining a dataset of records to be assigned to aggregation clusters; a computing module for computing an average record of the dataset on the basis of a predefined repetition counter; a finding module for finding a most distant first record to the average record using a distance measure and finding a most distant second record from the first record using the distance measure; a forming module forming a first aggregation cluster around the first record and a second aggregation cluster around the second record; and a generating module for generating a new dataset by subtracting the first cluster and the second cluster from the previous dataset. The forming module is adapted to apply the aggregation method attribute-wise on the records in the clusters. The system also provides the technical advantage that datasets can be anonymized faster as compared to the known micro-aggregation method.

According to a third aspect this is solved by a computer cluster having several nodes for anonymizing datasets having sensitive information, each node comprising a computing module for computing an average record of the dataset on the basis of a predefined repetition counter; a finding module for finding a most distant first record to the average record using a distance measure and finding a most distant second record from the first record using the distance measure; a forming module forming a first aggregation cluster around the first record and a second aggregation cluster around the second record; and a generating module for generating a new dataset by subtracting the first cluster and the second cluster from the previous dataset. The forming module is adapted to apply the aggregation method attribute-wise on the records in the clusters. The computer cluster also provides the technical advantage that datasets can be anonymized faster as compared to the known micro-aggregation method.

According to a fourth aspect this is solved by a computer program product (non-transitory computer readable storage medium having instructions, which when executed by a processor, perform actions) loadable into a memory of a digital computer comprising software code portions for executing the method according to the first aspect, when the computer program product is run on the computer. The system also provides the technical advantage that datasets can be anonymized faster as compared to the known micro-aggregation method.

BRIEF DESCRIPTION

Some of the embodiments will be described in detail, with reference to the following figures, wherein like designations denote like members, wherein.

DETAILED DESCRIPTION

Figure 1:
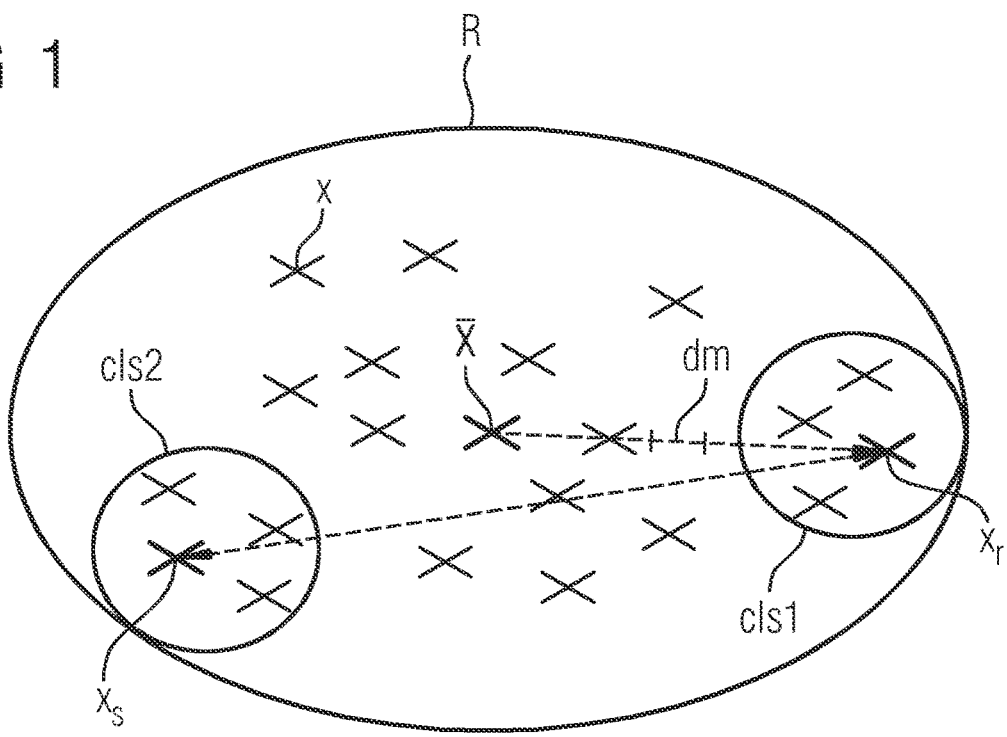
FIG. 1 shows a schematic view on a set of records to be assigned to aggregation clusters.

FIG. 1 shows a schematic view on a set of records R to be assigned to aggregation clusters cls. A method for anonymizing datasets having sensitive information to achieve k-anonymity can be based on the following steps:

While $|R| \geq 3k$ do ($|R|$ is the cardinality of the set of all records not yet assigned to an aggregation cluster)

a) Compute the average record $\bar{x}$ of all records in R. The average record $\bar{x}$ is computed attribute-wise based on an aggregation function.

b) Consider the most distant record $x_r$ to the average record $\bar{x}$ using an appropriate distance dm.

c) Find the most distant record $x_s$ from the record $x_r$ considered in the previous step.

d) Form two clusters around $x_r$ and $x_s$, respectively. One cluster contains $x_r$ and the k−1 records closest to $x_r$. The other cluster contains $x_s$ and the k−1 records closest to $x_s$.

e) Take as a new dataset R the previous dataset R minus the records in the clusters formed around $x_r$ and $x_s$ in the last instance of Step d).

End while

If there are between 3k−1 and 2k records in R:

f) compute the average record $\bar{x}$ of the remaining records in R.

g) find the most distant record $x_r$ from $\bar{x}$ h) form a cluster containing $x_r$ and the k−1 records closest to $x_r$ i) form another cluster containing the rest of records.

Else (less than 2k records in $|R|$) form a new cluster with the remaining records.

However, anonymizing large datasets on the basis of this method is slow, since in each iteration of the while loop a new average record $\bar{x}$, a most distant record $x_r$, and a most distant record $x_s$ are calculated.

Speed of the method can be increased drastically, when these values are not calculated in every iteration of the while loop. Thus, a new integer parameter calcRevision is introduced as a predefined repetition counter. This integer parameter calcRevision defines after how many iterations of the while loop a recalculation of the average record $\bar{x}$, $x_r$, and $x_s$ is performed. Thus, the number of iterations for calculating $\bar{x}$, $x_r$, and $x_s$ is reduced to the calcRevision-th and processing speed of the method is increased. A recalculation of $\bar{x}$, $x_r$, and $x_s$ in each iteration of the loop is prevented so that efficiency of the method is increased.

Until the loop counter is not in modulo agreement with the predefined value of calcRevision, the values $\bar{x}$, $x_r$, and $x_s$ remain unchanged and merely k closest records to $x_r$ and $x_s$ are searched for forming k-anonymity groups. This calculation is more efficient since the distance measure is known from the iterations executed beforehand.

Calculation speed can be increased further within the loop iteration by parallelizing or distributing. Each calculation within the iteration, like distance calculations, rankings, or average calculations, is implemented such that this calculation can be performed in a parallel or distributed way. As a consequence, processing speed of the method is dependent on the number of processing nodes.

Distributed frameworks as, e.g., Apache Hadoop and Spark are open-source software frameworks for distributed storage and distributed processing of very large data sets on computer clusters built from commodity hardware. Calculations are distributed across all nodes and results are gathered from these nodes. In this way speed can be increased drastically.

With respect to the previous method the new method can be expressed as follows (steps a) to i) are identical to the aforementioned steps a) to i) and all steps a) to k) are parallelized or distributed on several nodes):
While $|R| \geq 3k$ do
If #Iteration % calcRevision==0 (only each calcRevision-th iteration)
Execute steps a) to e)
Else
j) Form two clusters around $x_r$ and $x_s$, respectively. One cluster contains the k records closest to $x_r$. The other cluster contains the k records closest to $x_s$.
k) Take as a new dataset R the previous dataset R minus the records in the clusters formed around $x_r$ and $x_s$ in the last instance of Step j).
End While
If there are between 3k−1 and 2k records in R: Execute steps f) to i)
Else (less than 2k records in |R|) form a new cluster with the remaining records.

Nominal attributes comprise texts or words. Thus, common calculation methods often are insufficient for nominal attributes. Nevertheless, nominal attributes are often essential and common elements of big data. The method uses the steps of distance calculation and average calculation on the basis of nominal values.

In conventional methods the distance between two nominal values is calculated such that it is tested whether the values are identical or not. In case of average calculation on nominal values the most frequent value is selected in conventional methods.

Thus, a hierarchical generalization is used that can be described as follows:

A first stage generalization removes sensitive information from each record so that a plurality of records is generalized to a single target value. For example, in case of zip codes having five digits a first generalization is performed by replacing the fifth digit by a wild card. For example, the zip codes of 53754 and 53757 are generalized to 5375* and are equalized in first stage generalization.

A hierarchy of generalizations is a sequence of such generalization stages. Consequently, in a second stage generalization the two last digits of the zip code are replaced by wild cards. In the highest stage of generalization all information is removed and all values are replaced with wildcards.

For the aforementioned micro-aggregation following are used for nominal attributes:

The distance between two nominal values is determined by the stage of generalization (number) needed for equality. The distance is normalized by dividing by the maximum number of generalization stages. In this way is achieved that values having a close semantic similarity are assigned to the same group.

The average value for the nominal values of a group is a value arising from the lowest stage of generalization in which all values are equal. In this way a loss of information is reduced in averaging nominal attributes in comparison to the conventional method of taking the most frequent value.

Once the generalization logic for the nominal attribute is determined by a user having expert knowledge concerning the corresponding semantics, the algorithm is able to use it.

Figure 2:
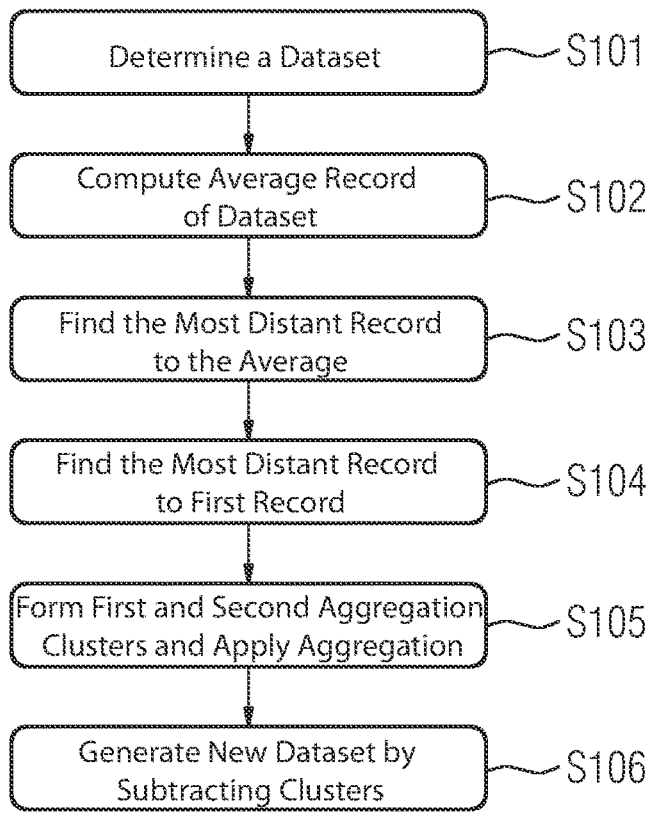
FIG. 2 shows a block diagram of a method for anonymizing datasets having sensitive information.

FIG. 2 shows a block diagram of method for anonymizing datasets having sensitive information. Among further steps as outlined above the method comprises at least the step S101 of determining a dataset R of records x to be assigned to aggregation clusters CLS; the step S102 of computing the average record $\bar{x}$ of the dataset R on the basis of the predefined repetition counter calcRevision; the step S103 of finding the most distant first record $x_r$ to the average record $\bar{x}$ using a distance measure dm on the basis of the predefined repetition counter calcRevision; the step S104 of finding a most distant second record $x_s$ from the first record $x_r$ using the distance measure dm on the basis of the predefined repetition counter calcRevision; the step S105 of forming the first aggregation cluster cls1 around the first record $x_r$ and a second aggregation cluster cls2 around the second record $x_s$ and applying the aggregation method attribute-wise on the records in the clusters; and the step S106 of generating a new dataset R by subtracting the first cluster cls1 and the second cluster cls2 from the previous dataset R.

All steps can be implemented by software modules in a computer program product or by hard-wired digital modules comprising circuits for performing the corresponding step.

The method provides for a unique improvement of processing speed so that anonymizing of big data and within big data systems is possible. Further, more reasonable results can be obtained by an improved processing of nominal attributes. These reasonable results are required for analysis of the data or subsequent processing.

Figure 3:
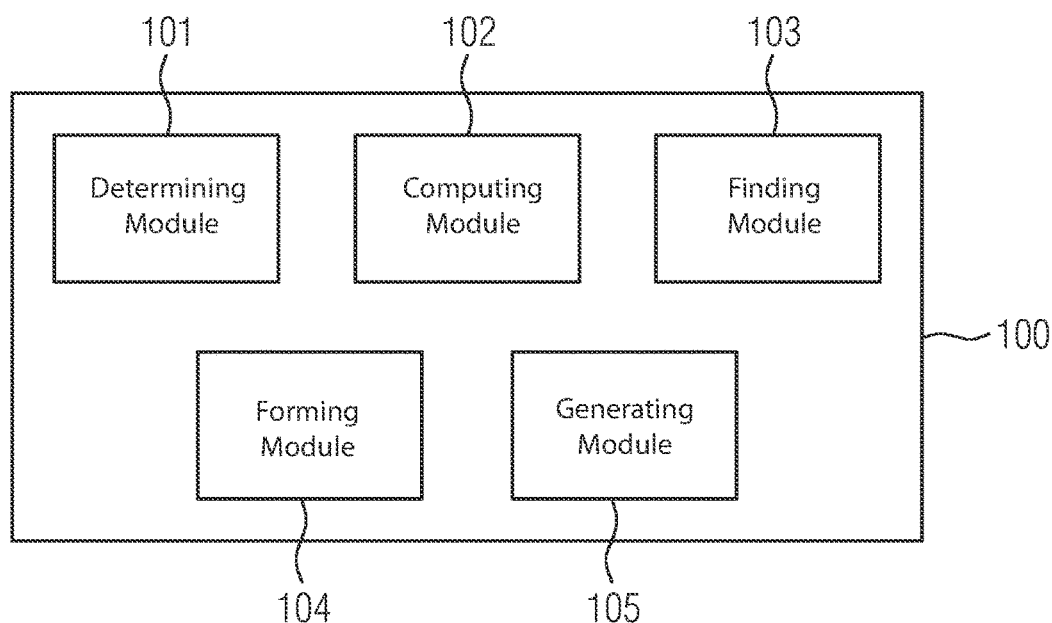
FIG. 3 shows a system for anonymizing datasets having sensitive information.

FIG. 3 shows a system 100 for anonymizing datasets having sensitive information. Among other modules the system 100 comprises a determining module 101 for determining the dataset R of records x to be assigned to the aggregation clusters CLS; a computing module 102 for computing the average record $\bar{x}$ of the dataset R on the basis of the predefined repetition counter calcRevision; a finding module 103 for finding the most distant first record $x_r$ to the average record $\bar{x}$ using the distance measure dm on the basis of the predefined repetition counter calcRevision and finding the most distant second record $x_s$ from the first record $x_r$ using the distance measure dm on the basis of the predefined repetition counter calcRevision; a forming module 104 forming S105 the first aggregation cluster cls1 around the first record $x_r$ and the second aggregation cluster cls2 around the second record $x_s$ and applying the aggregation method attribute-wise on the records in the clusters; and a generating module 105 for generating S106 the new dataset R by subtracting the first cluster cls1 and the second cluster cls2 from the previous dataset R.

All steps can be software modules in a computer program product or hard-wired digital modules comprising circuits for performing the corresponding step.

Figure 4:
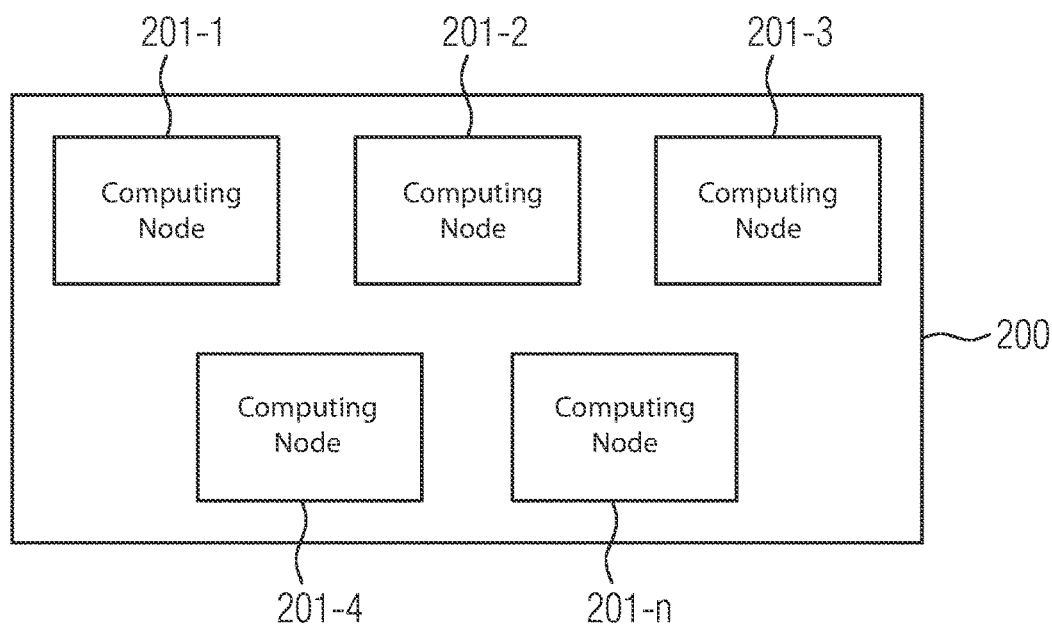
FIG. 4 shows a computer cluster for anonymizing datasets having sensitive information.

FIG. 4 shows a computer cluster 200 for anonymizing datasets having sensitive information. The computer cluster 200 comprises a number of computing nodes 201-1, . . . , 201-n each comprising a processor and a memory. The nodes 201-1, . . . , 201-n serve for a parallel or distributed execution of one, several or all of the aforementioned steps a) to k). To this end modules 101 to 105 are provided on the computing nodes 201-1, . . . , 201-n. The computing nodes 201-1, . . . , 201-n enable by a parallel or distributed processing and anonymizing of large datasets and can be efficiently used for big data.

Figure 5:
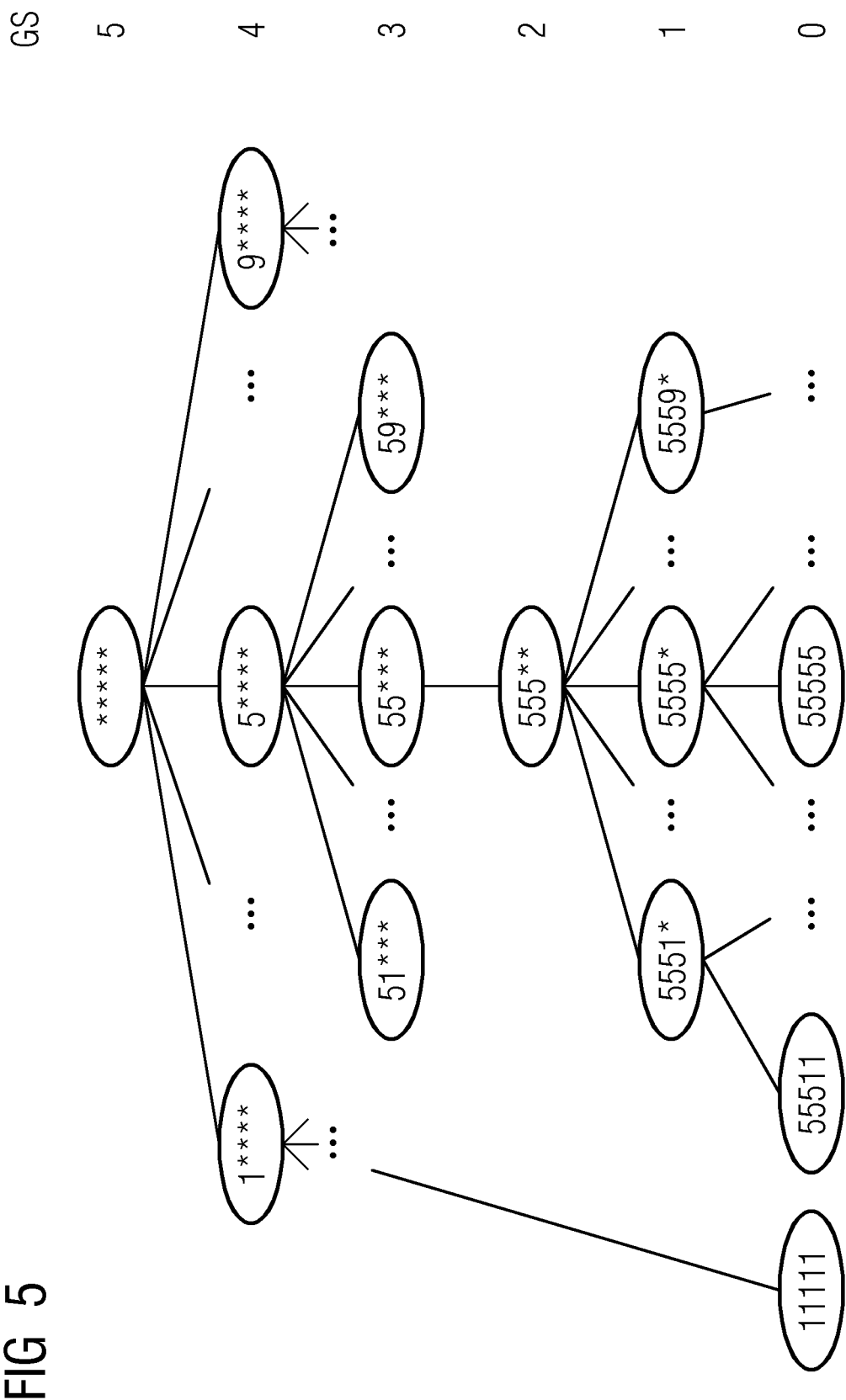
FIG. 5 shows a tree representing several generalization stages.

FIG. 5 shows a tree representing several stages of generalization GS. The normalized distance between two nominal values is expressed by the stage of generalization GS needed for equality between the two nominal values divided by the maximum number of generalization stages. In the depicted case the normalized distance from 11111 to 55555 is 5/5=1. The normalized distance from 55511 to 55555 is 2/5=0.4.

In general anonymizing plays an important role not only for processing and storing data, but also for being able to share information. Anonymizing is a piece of a puzzle for big data systems for processing and using big amounts of data.

Embodiments of the invention is particularly suitable for huge amounts of data and enables fast and complete achievement of k-anonymity over the pseudo-attributes of these data. In contrast conventional methods are not suitable for processing big data and cannot be employed to processing big data. In addition, handling nominal attributes of big data is not optimum in conventional methods. To further improve the usefulness of the results for further processing, the distance and average calculation method on nominal attributes is improved by using a generalization hierarchy for each nominal attribute.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for k-anonymizing datasets having sensitive information with improved processing speed, wherein k is a predetermined integer, the method comprising the steps of:
   determining, by at least one hardware processor, a dataset of records from the datasets to be assigned to aggregation clusters; and iterating the steps of:
   1) when an iteration number is a multiple of a predetermined integer parameter:
      computing an average record of the dataset;
      finding a most distant first record to the average record using a distance measure; and
      finding a most distant second record from the first record using the distance measure; and
   2) forming, by the at least one hardware processor, a first aggregation cluster around the first record and a second aggregation cluster around the second record, wherein the first aggregation cluster comprises k records closest to the first record and the second aggregation cluster comprises k records closest to the second record; and
   generating, by the at least one hardware processor, a new dataset by subtracting the first cluster and the second cluster from the dataset;
   wherein the predetermined integer parameter is a predefined repetition counter greater than 1 and the repetition counter is adapted to define after how many iterations a recalculation of the average record, the most distant first record, and the most distant second record is performed; and wherein the k-anonymizing is performed at least partially in parallel or distributed across a number of nodes using the predetermined repetition counter.

2. The method according to claim 1, wherein the step of computing the average record is performed in parallel or distributed on the number of nodes.

3. The method according to claim 1, wherein the step of finding the most distant first record is performed in parallel or distributed on the number of nodes.

4. The method according to claim 1, wherein the step of finding the most distant second record is performed in parallel or distributed on the number of nodes.

5. The method according to claim 1, wherein the average record is computed attribute-wise based on an aggregation function.

6. The method according to claim 1, wherein a hierarchical generalization having a number of generalization stages is used for computing the average record of a nominal attribute of the dataset or a distance between nominal values.

7. A computer program product, comprising a computer readable hardware storage device having computer readable program code stored therein, said program code executable by a processor of a computer system to implement the method according to claim 1.

8. A system for k-anonymizing datasets having sensitive information with improved processing speed, wherein k is a predetermined integer, the system comprising:
   at least one hardware processor configured to perform the steps of:
   determining a dataset of records from the datasets to be assigned to aggregation clusters; and
   iterating the steps of:
   1) When an iteration number is a multiple of a predetermined integer parameter:
      computing an average record of the dataset;
      finding a most distant first record to the average record using a distance measure; and
      finding a most distant second record from the first record using the distance measure; and the steps of:
   2) forming a first aggregation cluster around the first record and a second aggregation cluster around the second record, wherein the first aggregation cluster comprises k records closest to the first record and the second aggregation cluster comprises k records closest to the second record; and
   generating a new dataset by subtracting the first cluster and the second cluster from the dataset;
   wherein the predetermined integer parameter is a predefined repetition counter greater than 1 and the repetition counter is adapted to define after how many iterations a recalculation of the average record the most distant first record and most distant second record is performed; and wherein the k-anonymizing is performed at least partially in parallel or distributed across a number of nodes using the predetermined repetition counter.

9. A computer cluster having several nodes for k-anonymizing datasets having sensitive information with improved processing speed, wherein k is a predetermined integer, each node comprising:
   at least one hardware processor configured for performing a method of k-anonymizing, by parallel or distributed processing, wherein the method of k-anonymizing comprises:
   when an iteration number is a multiple of a predetermined integer parameter:
      computing an average record of a dataset;
      finding a most distant first record to the average record using a distance measure; and finding a most distant second record from the first record using the distance measure; and 2) forming a first aggregation cluster around the first record and a second aggregation cluster around the second record, wherein the first aggregation cluster comprises k records closest to the first record and the second aggregation cluster comprises k records closest to the second record; and generating a new dataset by subtracting the first cluster and the second cluster from the dataset;

wherein the predetermined integer parameter is a predefined repetition counter greater than 1 and the repetition counter is adapted to define after how many iterations a recalculation of the average record the most distant first record and most distant second record is performed; and wherein the k-anonymizing is performed at least partially in parallel or distributed across a number of nodes using the predetermined repetition counter.

* * * * *